UNITED STATES PATENT OFFICE.

CHARLES R. MILKS, OF WATERFORD, NEW YORK.

IMPROVED COMPOSITION FOR COATING SHIPS.

Specification forming part of Letters Patent No. 56,078, dated July 3, 1866.

*To all whom it may concern:*

Be it known that I, CHARLES R. MILKS, of Waterford, in the county of Saratoga and State of New York, have invented a new and useful Composition of Matter for Coating the Bottoms of Vessels and other analogous uses; and I do hereby declare that the following is a full, clear, and exact description of the mode of compounding and preparing the same.

The object of this composition is its application to the bottoms of vessels for the purpose of forming a surface to which barnacles will not adhere, and also one which worms will not penetrate. The advantages claimed for it are that it is cheap, easy of application, and, while accomplishing the above-designated object of protecting the bottoms and other parts of vessels, it forms a very hard and smooth surface, thus diminishing the resistance of the water to the passage of the vessel.

The following proportions show the quantities of the respective ingredients required in the preparation of thirty-three gallons of the composition, viz: Of coal-tar, twenty-six gallons; of benzine, two and one-half gallons; of linseed-oil, two gallons; of asphaltum, seven pounds; of gum-shellac, seven pounds; of soap-stone, (pulverized,) eight pounds; of plaster-of-paris, eight pounds; of india-rubber, one pound; of potash, three pounds.

In preparing the composition the rubber, cut in small pieces, is dissolved in the benzine, in which it should remain three days in a close vessel. The potash is dissolved in two and one-half gallons of water, which being boiled, the shellac is added and dissolved. The mixture should then be allowed to stand fifteen minutes, when it is fit for use. When the dissolved rubber has stood three days, as required, put four gallons of coal-tar into a large kettle, pound the asphaltum fine and put into the coal-tar; then make a moderate fire under the kettle, and in fifteen minutes the asphaltum will be dissolved; then add the remainder of the coal-tar, and afterward the shallac solution, the rubber solution, and the linseed-oil; then subject the whole to a scalding (not boiling) heat, after which add the soap-stone and plaster-of-paris. Stir the ingredients in the kettle while in the process of mixing.

The composition thus prepared is applied cold with a brush.

What I claim as my invention, and desire to secure by Letters Patent, is—

A composition of matter compounded from the hereinbefore-named ingredients or their chemical equivalents, substantially in the manner and for the purposes set forth.

In testimony whereof I have signed my name to this specification in the presence of two subscribing witnesses.

CHARLES R. MILKS.

Witnesses:
JOHN S. HOLLINGSHEAD,
D. P. HOLLOWAY.